United States Patent Office 3,355,444
Patented Nov. 28, 1967

3,355,444
PROCESS OF FINING GELATIN USING PHOSPHATES AND WATER-SOLUBLE CARBONATES
Nicholas J. Kalafatas, Arlington, and George A. Consolazio, Burlington, Mass., assignors to General Foods Corporation, White Plains, N.Y., a corporation of Delaware
No Drawing. Filed Mar. 4, 1966, Ser. No. 531,782
7 Claims. (Cl. 260—118)

ABSTRACT OF THE DISCLOSURE

A gelatin solution (or extract) is treated to obtain a clarified, essentially turbidity- and haze-free solution having a reduced content of metallic ions and of organic contaminants by adding to the solution a phosphate ion-containing compound, adjusting the pH of the solution to about 6.0, adding a carbonate to the solution, adjusting the pH of the solution to about 8.5 to 9.5, whereby a metallic carbonate precipitate is formed which is then separated from the solution together with coprecipitated and occluded contaminants.

---

This invention relates to the treatment of gelatin. More particularly, it relates to a process of clarifying or fining gelatin to reduce the concentration of metallic ions therein and to lower the level of organic contaminants therein.

During the lengthy and numerous processing steps which are required to recover gelatin from various sources such as pig skins, lime splits and ossein, the source material may be treated with a variety of reagents such as lime, magnesium oxide, barium oxide, caustic soda, hydrochloric acid, sulfuric acid, phosphoric acid, etc. When the cations and anions from such reagents are carried through the later processing steps, the resultant gelatin extract or solution may have poor clarity and may even be turbid. Trace amounts of metallic ions may also be present in the gelatin extract or solution because of the contact of the gelatin source material or the gelatin extract or solution with metallic process equipment surfaces. In addition, water, which is extensively used in gelatin manufacturing processes, may serve to introduce obnoxious and troublesome cations and anions, usually in the form of dissolved salts, into the gelatin extract or solution.

While the amount of the various metallic ions in a gelatin extract or solution may vary widely, even trace amounts of one or all may produce undesirable haze or turbidity. Among the trace metallic ion impurities which may cause problems in obtaining a sparkling, clear gelatin extract or solution are those of the alkaline earth metals, metals of the iron group, the rare earth metals, noble metals and metals of the platinum group. It appears that the problem of poor clarity of a gelatin extract or solution may be caused by insoluble simple or complex inorganic salts of such metallic ion impurities or other cations or metallo protein complexes.

Further, it is generally desirable to have a dried gelatin product with a low ash content, as measured as the oxide, since an ash content above about 2% may frequently cause the gelatin to be rejected for certain uses. However, the presence of alkaline earth metals or other heavy metals is also known to increase the ash content. Thus, many metals whose presence increases the ash content are troublesome also in producing haze or turbidity. Since calcium, like other alkaline earth metals generally may frequently be present as soluble salts, the problem of effectively removing them has long presented itself. In addition, metals of the iron group, particularly iron and chromium, have been noted to cause undesirable haze in gelatin extract or solution and to increase the ash content.

Moreover, various metals, particularly iron and chromium, may also produce undesirable color in the gelatin extract or solution. Further, many of these metals may seriously interfere with the production of gelatin for certain purposes such as photographic usage.

Naturally occurring organic materials, their degradation products and their metallo-complexes in gelatin source material also present a clarity problem.

Various prior art techniques have been described for treating or clarifying gelatin extract or solution. However, such prior art methods have certain undesirable characteristics such as long processing times, use of expensive reagents for treatment and special filtration equipment, employment of high temperatures for substantial periods of time, etc. A further disadvantage of several prior methods is seen in their resulting in degradation of gelatin because of the processing techniques employed, for example, use of very low or very high pH conditions, high temperatures, and the like. Degradation is evidenced by a lowering of the bloom and/or the viscosity of the gelatin, which characteristics are generally desired to be kept at a high level.

It is an object of this invention to provide a process for clarifying or fining a gelatin solution.

It is a further object of this invention to provide a process for clarifying or fining a gelatin solution containing metallic ions and organic contaminants to produce a gelatin product having superior clarity, a reduced content of trace metals and a lowered ash content.

It is a still further object of this invention to provide a process for the treatment of a gelatin solution to obtain a clarified, essentially turbidity- and haze-free gelatin solution wherein the disadvantages of various prior art methods are overcome or substantially eliminated.

As used herein, the term "fining" is defined as one in which a gelatin extract or solution is improved in clarity and color by precipitating therein a crystalline mass. During precipitation, the crystalline mass serves to remove various impurities and contaminants and to improve the color and clarity of the gelatin extract or solution. The resultant dried gelatin product is found to have a desirably low ash content. Precipitation, however, may be further understood in the light of the present specification as also including any one or combination of several phenomena such as occlusion, coprecipitation, absorption, adsorption, etc.

In accordance with the present invention, it has now been unexpectedly discovered that a gelatin extract or solution containing metallic ions and organic contaminants may be effectively treated by a fining process involving:

(1) adding a compound furnishing phosphate ion to a gelatin solution having a pH below 5.5,
(2) adjusting the pH of the solution to at least about 6.0,
(3) adding a soluble carbonate selected from the group consisting of alkali metal and ammonium carbonates to the solution,
(4) adjusting the pH of the solution to about 8.0 to 10.0, whereby a carbonate precipitate of metallic ions forms; and
(5) separating said precipitate together with coprecipitated and occluded contaminants from the solution.

Although the use of phosphates for clarifying gelatin is known, the prior art methods are not entirely satisfactory for obtaining gelatin having only trace amounts of metallic ions and of organic contaminants and a low ash content.

Thus, Christopher et al., U.S. 1,895,446, in describing a then know procedure for clarifying bone gelatin solutions, indicated that alkaline earths may be precipitated therefrom at pH 7 using phosphoric acid.

Later, Schwartz, U.S. 2,191,206, suggested employing solutions of metaphosphates and/or tripolyphosphates for purifying gelatin stock at pH 5–7. However, such treatment is prior to extraction of gelatin from the stock and the impurities are removed in the form of soluble phosphate complexes.

Recently, in U.S. 3,153,030, in which one of us is a joint inventor, an effective method for fining is taught utilizing phosphates alone and with magnesium salts at a selected alkaline pH range. While a high degree of clarity and a marked lowering in the concentration of metallic ions is accomplished by such method, the ash content of the gelatin is not as low as might be desired and the usage of phosphate is high because of the required formation of various phosphate precipitates.

Copending application Ser. No. 111,880 filed Jan. 11, 1961, now U.S. Patent No. 3,244,689, in which we are among the joint inventors, describes an alternative fining process involving the combined actions of an aluminum salt with either or both carbonate and phosphate salts. The aluminum salt becomes hydrated at an alkaline pH to form aluminum hydrate, a floc, which when filtered carries along with it, from the gelatin, trace metals and organic haze-producing matter. Because the floc so formed is gelatinous, difficulties are experienced in filtration unless long holdup periods and the use of costly filter aids are resorted to. Further, the level of usage of phosphate is high. A consequent loss of gel strength and viscosity of the gelatin is also encountered.

A process that seems related to the process of the aforesaid copending application is disclosed in Fogiel et al., U.S. 3,184,445, which teaches the use of freshly prepared dicalcium phosphate in combination with an aluminum salt. While improved clarity would appear to be achieved by this process, the patentees state that a subsequent separate de-ashing step is required and that the age of the dicalcium phosphate is critical.

Our copending application Ser. No. 531,783 filed of even date herewith, discloses a method of fining employing carbonates that is very effective for reducing the concentration of ions of various metals such as, for example, iron, chromium, calcium, etc., for lowering the ash content and also for improving clarity of gelatin. The process results in a marked lowering of the iron content of gelatin prepared from source material as, for example, tanners' stock and ossein having a history of lime treatment. Similarly, clarity improvement and ash reduction were most noticeable in gelatin obtained from such source material, which it may be recognized, had a relatively high calcium content.

The present invention is based upon the surprising finding that the use of phosphates in combination with carbonates affords particularly significant and unexpected improvements in lowering of the metallic ion concentration, especially that of iron, calcium, chromium, lead, etc.; reduction in the ash content; and clarity of gelatin. Such advantages are realized regardless of the source material of the gelatin or of the treatment received by the stock, either lime or acid, and with a minimum of processing steps.

The gelatin solution to be treated according to the process of this invention may be a solution that is recovered at late stage, e.g. after evaporation, in the overall process, usually just prior to drying. However, the gelatin solution may also be obtained by dissolving dry product gelatin in water to form a solution having approximately the same concentration as a solution obtained at the evaporation stage. Gelatin solutions having a concentration of about 10–30%, typically 20%, gelatin are advantageously treated by this process, although it is apparent that solutions having lower concentrations may also be processed.

The gelatin which may be treated according to the process of this invention may be one wihch has been prepared by either the so-called acid process or alkaline or lime process, that is, either type A or type B gelatin. Especially advantageous results appear to be evidenced by employing gelatin which has been obtained from alkaline or lime processed cattle or calf hides, typically tanners' stock or ossein. It will be apparent that depending upon the source materials as well as the processing conditions used to extract the gelatin, greater or lesser amounts of metallic ions and organic contaminants will be found therein. Thus, for example, gelatin which has been extracted and recovered from pig skins treated by the so-called acid process will generally contain substantially less calcium or other alkaline earth metals than a gelatin which has been recovered from lime splits or ossein.

Suitable sources of phosphate ion are furnished by any one or a mixture of water-soluble phosphates such as the alkali metal and ammonium phosphates, orthophosphates, pyrophosphates, metaphosphates, orthophosphoric acid, metaphosphoric acid and polyphosphoric acid. Generally, the use of orthophosphoric acid is preferred. Soluble phosphate salts which may also be employed are included in the following non-limiting listing: monosodium phosphate, disodium phosphate, trisodium phosphate, monoammonium phosphate, diammonium phosphate, triammonium phosphate, sodium hexameta phosphate, tetrasodium pyrophosphate, and sodium metaphosphate. The amount of water soluble phosphate which is employed may be varied taking into account the concentration of metllic ions and the amount of contaminants present in the to be treated gelatin extract or solution and the degree of clarity or purification that is desired. Ordinarily, the amount of soluble phosphate used is from 0.01 to 0.5% based upon the weight of dry gelatin. While the phosphate/gelatin ratio may be increased, no particular advantage is seen to be afforded thereby.

The phosphate is ordinarily added as an aqueous solution to the gelatin extract or solution. Appropriate adjustment of the concentration of the phosphate solution to prevent localized excessive pH decrease will, of course, be apparent.

The pH of the gelatin extract or solution prior to the addition of a water soluble phosphate will vary depending upon the type of gelatin which is being treated according to the clarifying or fining method of this invention. Thus, in the case of gelatin which has been recovered by an acid treatment process, the pH will usually be about 5.0 to 6.0 while a gelatin obtained by an alkaline or lime process will usually have a pH of 6.5 to 7.5. Preferably, the pH of the gelatin solution having present a phosphate ion will be advantageously adjusted to about 4.8 to 5.2 by adding thereto an acid such as hydrochloric, sulfuric, etc. Such pH control has been unexpectedly found to permit the addition of lesser amounts of phosphate thereby resulting in an even lower ash content for the gelatins treated. In certain instances, pH adjustment is unnecessary since the addition of phosphate, especially phosphoric acid, is effective in lowering the pH of the gelatin solution to the desired level.

Prior to the addition of carbonate, the pH of the gelatin solution is adjusted, if necessary, to at least about 6.0, preferably 6.0 to 6.2, employing a suitable base such as ammonium hydroxide, an alkali metal hydroxide, an alkaline earth metal hydroxide, etc. Such pH control is desirable in order to prevent decomposition of the carbonate.

Suitable carbonates include the alkali metal and ammonium carbonates and bicarbonates. Thus, when reference to "carbonate" appears herein, such term is to be construed to also include bicarbonate. Of the soluble carbonates and bicarbonates which may be employed, the use of ammonium carbonate is especially preferred because of the volatility of the cation portion thereof, i.e., $NH_4^+$. Thus, its use does not result in the introduction of cations whose presence may serve to actually increase the ash content of the gelatin to be processed.

The amount of carbonate added, is, of course, dependent upon the degree of clarity and level of ash content desired. Ordinarily, an amount of carbonate from about 2 to 10%, preferably 2 to 6%, based upon the weight of dry gelatin in solution is satisfactory.

Following the addition of a soluble carbonate, the pH of the gelatin solution is then adjusted to about 8.0 to 10 with a suitable base. Preferably, the base is one which is volatile as, for example, ammonia, ammonium hydroxide, etc. However, soluble alkali metal and alkaline earth metal hydroxides such as calcium hydroxide, sodium hydroxide, potassium hydroxide, barium hydroxide, magnesium hydroxide, and the like may be used. It will be apparent, however, that the use of certain alkaline earth metal hydroxides for pH adjustment is not especially desired since the addition of such bases has the effect of forming a precipitate from reagents that are added rather than a precipitate with those metallic ions which are present in the gelatin solution to be treated.

Subsequently, a carbonate precipitate of metallic ions, principally calcium carbonate, forms in the gelatin solution. Together with the carbonate precipitate, which appears to be reasonably stable, that is, non-redissolving at pH 8.0 to 9.5 of the gelatin solution, coprecipitated and occluded contaminants are carried down from the gelatin solution. Such coprecipitated and occluded materials may include metallo-protein complexes, colloidally dispersed impurities, etc.

If desired, precipitation may be accomplished in the presence of a small amount of a nucleation aid or flocculating agent. However, the use of such is not essential. Typical nucleation aids and flocculating agents include aluminum silicate, silica, diatomaceous earth, wood pulp, alpha-cellulose, and the like.

Following the precipitation step, the gelatin solution is filtered, preferably employing a filtration aid such as, for example, aluminum silicate, silica, diatomaceous earth, wood pulp, alpha-cellulose and the like. Alternatively, the precipitate may be separated from the fined gelatin solution by centrifugation, decantation, or the like although such procedure is less desirable. If desired, the gelatin solution may be further processed by treating the same with bleaching agents, color removal aids, and odor reducing bodies.

The temperature at which the several steps of the fining process may be carried out is usually in the range of 100° to 150° F., most preferably, from 110° to 130° F. The time for the overall process is dependent upon the degree of clarity that is desired in the gelatin solution and the amount of metallic ion and organic contaminants that may be present in the gelatin solution. Ordinarily, a total processing time of from about 15 minutes to two hours is adequate.

The gelatin is recovered by conventional means, i.e., evaporated, chilled, dried and comminuted.

The gelatin product prepared in accordance with the process of this invention is unexpectedly characterized by superior clarity of its solutions and considerably reduced amounts of iron, calcium, chromium, lead and other trace metallic ions usually present in gelatin. Moreover, the lowering of the level of certain metals, for example, chromium and lead, also serves to decrease or eliminate a possible toxicity problem while the reduction in the amount of organic contaminants results in excellent freedom from haziness in solutions prepared from the gelatin product. The gelatin product is further noted for its extremely low ash content. Yet, such desirable objectives are obtained without undesirable loss of gelatin or of the desired properties such as viscosity and bloom.

Thus, the process of the present invention affords a reduction in the iron content of gelatin to below about 15 parts per million, results in lowering the ash content to approximately less than 1%, and markedly improves the clarity of a solution prepared therefrom. While gelatin from tanners' stock is particularly noted to be improved by this process, gelatin from any source material may be treated with similarly good results. It is thus seen that the use of phosphate and carbonate is more attractive than many prior art clarification methods because of the crystalline, readily filterable precipitate that is formed in the gelatin solution. It further appears that the use of phosphate in combination with carbonate has a synergistic effect upon the reduction or removal of iron, calcium, chromium, lead and other trace metals, and the improvement in clarity of the gelatin solutions. Also, the addition of phosphate ion and control of the pH during and after its addition seem to result in lower amounts of phosphate being used while still effecting a marked lowering of the ash content in the gelatin.

In order to more fully illustrate the practice of the present invention, but without limiting it thereto, the following examples are given:

EXAMPLE 1

Lime processed tanners' stock is extracted in a conventional manner to yield a gelatin solution which is then vacuum concentrated to 20% gelatin solids. A sample of the concentrate after pressure filtering is diluted with water to a 6⅔% concentration. This solution is characterized by its poor clarity and turbid appearance. Another sample is chilled and dried to obtain a gelatin product having a moisture content of 10%. This product, upon analysis, is shown to have an iron content of 44 parts per million.

EXAMPLE 2

To another portion of the 20% gelatin solution of Example 1 maintained at 110° F. to 120° F. and having a pH of 6.3 is added, with agitation, ammonium carbonate in aqueous solution in an amount equivalent to 6% based upon the weight of gelatin solids. Ammonium hydroxide is then added to raise the pH to 9.0. The solution became more turbid because of the formation of insoluble calcium carbonate. The precipitate is allowed to settle for 20 minutes and is then pressure filtered through a metal-free filter employing diatomaceous earth filter aid. The effluent from the filter is substantially colorless and has a very high degree of clarity. The filtered solution is evaporated to 30% concentration, chilled and air dried. During evaporation and drying ammonia is released from the solution and the dry, finished gelatin is noted to have a pH of 6.7, a level generally desired. The iron content of the gelatin is found to be 30 parts per million.

EXAMPLE 3

The procedure of Example 2 is repeated in all essential respects except that orthophosphoric acid in an amount equivalent to 0.01% based on the weight of gelatin is added to the gelatin solution prior to the addition of ammonium carbonate. The pH of the gelatin solution after phosphate addition is observed to be 6.25. A high degree of clarity in the filter effluent is again observed and the iron content of the dry finished gelatin is 30 parts per million.

EXAMPLE 4

The procedure of Example 3 is repeated in all essential respects except that orthophosphoric acid in an amount equivalent to 0.10% based on the weight of gelatin is employed. The pH of the gelatin solution after phosphate addition is observed to be 6.00. Clarity improvement similar to that obtained in Example 3 is noted and the iron content of the dry finished gelatin is 15 parts per million.

EXAMPLE 5

The procedure of Example 3 is repeated in all essential respects except that orthophosphoric acid in an amount equivalent to 0.50% based on the weight of gelatin is employed. The pH of the gelatin solution after phosphate addition is observed to be 5.55. Clarity improvement similar to that obtained in Example 3 is noted and the iron content of the dry finished gelatin is 7 parts per million.

EXAMPLES 6–15

The procedure of Example 3 is repeated in all essential respects except that the amount of orthophosphoric acid is varied from 0.025 to 0.3% based on the weight of gelatin; hydrochloric acid is added to adjust the pH of the gelatin solution over the range of 3.00 to 5.55 and the pH of the solution is further adjusted to 6.0 to 6.2 with ammonium hydroxide prior to the addition of ammonium carbonate. Iron content, measured in parts per million, of the dry finished gelatin is found to be from 3.5 to 7.5 except in two examples where very low amounts of orthophosphoric acid are used.

EXAMPLE 16

The procedure of Example 2 is modified by eliminating the steps of addition of ammonium carbonate and adjustment to pH 9 with ammonium hydroxide, and by adding orthophosphoric acid in an amount equivalent to 0.3% based upon the weight of gelatin and by adjusting the pH of the solution to 4.00 with hydrochloric acid prior to filtration. The iron content of the dry finished gelatin is noted to be 34.9 parts per million.

The procedures employed and results obtained in the foregoing examples are summarized in the following table:

TABLE I

| Ex. No. | pH of Gelatin on addition of phosphate (as $H_3PO_4$) | Phosphate Added (Percent gelatin solids) | Iron (p.p.m.) in treated, filtered gelatin solution | Comments |
|---|---|---|---|---|
| 1 | 6.3 | 0 | (44) | As-is gelatin, not treated |
| 2 | 6.3 | 0 | 30 | Control, treated with 6% $(NH_4)_2CO_3$ and $NH_4OH$ only. |
| 3 | 6.25 | 0.01 | 30 | pH reduction due to phosphoric acid alone. |
| 4 | 6.00 | 0.1 | 15 | Do. |
| 5 | 5.55 | 0.5 | 7 | Do. |
| 6 | 5.50 | 0.3 | 7.5 | pH adj. with HCl |
| 7 | 5.00 | 0.3 | 4.5 | Do. |
| 8 | 4.00 | 0.3 | 6.5 | Do. |
| 9 | 3.00 | 0.3 | 4.5 | Do. |
| 10 | 5.50 | 0.2 | 6.0 | Do. |
| 11 | 5.00 | 0.2 | 5.1 | Do. |
| 22 | 5.55 | 0.1 | 5.5 | Do. |
| 13 | 5.00 | 0.1 | 3.5 | Do. |
| 14 | 5.00 | 0.05 | 25.8 | Do. |
| 15 | 5.00 | 0.025 | 19.8 | Do. |
| 16 | 4.00 | 0.3 | 34.9 | No ammonium carbonate treatment; pH adj. with HCl. |

NOTE.—Examples 4, 12 and 13 show the effect of pH at the same level of phosphate on iron reduction and Example 16 shows the effect of phosphate alone.

EXAMPLES 17–23

Employing a different lot of gelatin, Examples 1, 2, 3, 4, 5, 12 and 13 are repeated.

The procedures employed and results obtained are summarized in the following table:

TABLE II

| Ex. No. | pH of gelatin on addition of phosphate | Phosphate added (percent gelatin solids) | Iron (p.p.m.) in treated filtered gelatin solution | Comments |
|---|---|---|---|---|
| 17 | 6.4 | 0 | (30) | As-is not treated gelatin. |
| 18 | 6.4 | 0 | 19.8 | Control. Treated with 6% $(NH_4)_2CO_3$ and $NH_4OH$ only |
| 19 | 6.3 | 0.1 | 22.3 | |
| 20 | 6.05 | 0.3 | 19.5 | |
| 21 | 5.9 | 0.5 | 11.8 | |
| 22 | 5.5 | 0.1 | 9.6 | pH adjusted with HCl |
| 23 | 5.0 | 0.1 | 4 | Do. |

EXAMPLES 24–27

Employing different lots of gelatin having varying metallic ion and ash contents, the procedure of Example 11 is repeated in all essential respects. The results obtained are summarized in the following table:

TABLE III

| Ex. No. | Iron, p.p.m. | | Chromium, p.p.m. | | Lead, p.p.m. | |
|---|---|---|---|---|---|---|
| | As-is feed gelatin | Treated gelatin | As-is feed gelatin | Treated gelatin | As-is feed gelatin | Treated gelatin |
| 24 | 94 | 6.6 | 7.9 | 1.2 | 8.1 | 0.7 |
| 25 | 62 | 4 | 6.2 | 1.5 | 7.8 | 0.7 |
| 26 | 60 | 6.6 | 7.0 | 1.1 | 7.9 | 0.6 |
| 27 | 58 | 12.0 | 6.8 | 1.3 | 5.0 | 0.9 |

| Ex. No. | Percent CaO | | Ash, p.p.m. | | Clarity | |
|---|---|---|---|---|---|---|
| | As-is feed gelatin | Treated gelatin | As-is feed gelatin | Tretted gelatin | As-is feed gelatin | Treated gelatin |
| 24 | .34 | .045 | 1.95 | 0.76 | Poor | Excellent. |
| 25 | .30 | .030 | 1.83 | 0.76 | do | Do. |
| 26 | .27 | .026 | 1.85 | 0.63 | do | Do. |
| 27 | .26 | .024 | 1.73 | 0.57 | do | Do. |

The above-tabulated data indicates that the iron content of gelatin fined in accordance with the process of this invention may be advantageously reduced to less than 15 parts per million, a level which is about 50% below that of the iron content in gelatins clarified by conventional technique and about 80% below that of the iron content in untreated gelatins. Similar reductions in chromium, lead and calcium contents are observed. Also surprisingly significant is the lowering of ash content of gelatin treated by this process to a level below about 1%. The marked improvement in clarity of solutions of gelatins so-treated is also apparent.

EXAMPLE 28

A Type "A" gelatin, extracted in a conventional manner from pigskins, is found to have an iron content of 34 parts per million and an ash content of 0.33% on an as-is basis. Filtration of a solution of this lot of gelatin only reduced its iron content to 31 parts per million and its ash content to 0.32%.

However, when this lot is treated according to essentially the same procedure as that in Example 11, the iron content of the gelatin is lowered to 6 parts per million and the ash content is found to be 0.11%.

While the present invention has been described in conjunction with various preferred embodiments, it is to be understood that it is not to be merely and so restricted thereto. It will be apparent that numerous modifications and advantages of the invention will be obvious and, therefore, no limitations should be set therein except insofar as they appear in the appended claims.

We claim:
1. A process of fining a gelatin solution containing metallic ions and organic contaminants consisting of:
   (1) adding a compound furnishing phosphate ion to said gelatin solution,
   (2) adjusting the pH of said solution to at least about 6.0,
   (3) adding a carbonate selected from the group consisting of soluble alkali metal and ammonium carbonates to said solution,
   (4) adjusting the pH of said solution to about 8.5 to 9.5, whereby a carbonate precipitate of metallic ions forms, and
   (5) separating said precipitate together with coprecipitated and occluded contaminants from said solution.

2. The process of claim 1 in which said phosphate ion is furnished by a water-soluble phosphate selected from the group consisting of alkali metal and ammonium phosphates, orthophosphates, pyrophosphates, metaphosphates, orthophosphoric acid, metaphosphoric acid, polyphosphoric acid and mixtures thereof.

3. The process of claim 2 in which the pH adjustment to 8.5 to 9.5 is made employing a compound selected from the group consisting of ammonia, ammonium, alkali metal and alkaline earth metal hydroxides.

4. The process of claim 3 in which the carbonate is ammonium carbonate.

5. A process of fining a gelatin solution containing metallic ions and organic contaminants consisting of:
  (1) adding a compound furnishing phosphate ion to said gelatin solution,
  (2) adjusting the pH of said solution to at least about 6.0,
  (3) adding a carbonate selected from the group consisting of soluble alkali metal and ammonium carbonates to said solution,
  (4) adjusting the pH of said solution to about 8.5 to 9.5, whereby a carbonate precipitate of metallic ions forms, and
  (5) separating said precipitate together with coprecipitated and occluded contaminants from said solution by means of filtration, employing a filtration aid.

6. The process of claim 5 in which said carbonate is ammonium carbonate.

7. A process of fining a gelatin solution containing metallic ions and organic contaminants which consists of:
  (1) adding phosphoric acid to a gelatin solution having pH less than 5.5, and maintained at a temperature of 110° to 120° F. and containing 15–25% gelatin solids,
  (2) adjusting the pH of said solution to 6.0 to 6.2 with ammonium hydroxide,
  (3) adding an aqueous ammonium carbonate solution to said gelatin solution,
  (4) subsequently adding ammonium hydroxide to said gelatin solution to adjust the pH thereof to about 8.6 to 9.0, whereby a carbonate precipitate of metallic ions forms,
  (5) separating said precipitate together with coprecipitated and occluded contaminants, and
  (6) recovering a fined gelatin solution.

References Cited

UNITED STATES PATENTS

| | | | |
|---|---|---|---|
| 1,895,446 | 1/1933 | Christopher et al. | 260—118 |
| 2,191,206 | 2/1940 | Schwartz | 260—118 |
| 3,153,030 | 10/1964 | Consolazio | 260—118 |
| 3,184,445 | 5/1965 | Fogiel et al. | 260—118 |
| 3,244,689 | 4/1966 | Huntoon et al. | 260—118 |

OTHER REFERENCES

Inorganic Chemistry, Ephraim, 1943, pp. 723–728 and 801–805.

WILLIAM H. SHORT, *Primary Examiner.*

H. SCHAIN, *Assistant Examiner.*